(12) United States Patent
Zhu (10) Patent No.: US 11,549,724 B2
(45) Date of Patent: Jan. 10, 2023

(54) SOLAR PANEL MOUNT

(71) Applicant: Guohao Zhu, Haining (CN)

(72) Inventor: Guohao Zhu, Haining (CN)

(73) Assignee: HAINING CHUANGYUAN SOLAR ENERGY TECHNOLOGY CO, LTD., Zhejiang (CN)

( * ) Notice: Subject to any disclaimer, the term of this patent is extended or adjusted under 35 U.S.C. 154(b) by 189 days.

(21) Appl. No.: 16/797,153

(22) Filed: Feb. 21, 2020

(65) Prior Publication Data

US 2021/0190384 A1  Jun. 24, 2021

(30) Foreign Application Priority Data

Dec. 19, 2019  (CN) .......................... 201911316060.3

(51) Int. Cl.
*F24S 25/30* (2018.01)
*F24S 25/00* (2018.01)

(52) U.S. Cl.
CPC ......... *F24S 25/30* (2018.05); *F24S 2025/806* (2018.05)

(58) Field of Classification Search
None
See application file for complete search history.

(56) References Cited

U.S. PATENT DOCUMENTS

| | | | | |
|---|---|---|---|---|
| 6,565,048 B1 * | 5/2003 | Meyer | ....................... | F16L 3/02 248/58 |
| 8,806,815 B1 * | 8/2014 | Liu | ....................... | F24S 25/615 52/173.3 |
| 8,839,575 B1 * | 9/2014 | Liu | ....................... | F24S 25/613 52/173.3 |
| 8,844,887 B2 * | 9/2014 | Genschorek | .......... | F24S 25/613 52/90.2 |
| 9,853,594 B2 * | 12/2017 | Almy | ....................... | H02S 20/23 |
| 10,845,093 B2 * | 11/2020 | Stephan | ................ | F24S 25/636 |
| 2013/0206941 A1 * | 8/2013 | Esken | .................... | F16M 13/02 248/237 |
| 2018/0238589 A1 * | 8/2018 | Ash | ......................... | H02S 20/23 |

* cited by examiner

*Primary Examiner* — Steven M Marsh
(74) *Attorney, Agent, or Firm* — Fox Rothschild LLP (57) ABSTRACT

A solar panel mount for installing a solar panel on a roof. The mount generally includes a bracket plate a first surface, a top edge, a bottom edge, two opposite side edges flanking the first surface, wherein at least a portion of one of side edges is in the form of a flange transverse to the first surface; and a base plate attached to the bottom edge of the bracket plate.

21 Claims, 12 Drawing Sheets

Figure 15

SOLAR PANEL MOUNT

FIELD

The present disclosure relates to a solar panel mount for installing a solar panel to a roof structure, such as a slate roof constructed from a plurality of slate tiles.

BACKGROUND

Solar energy is an increasingly popular source of electrical energy. Solar energy is typically harvested through the use of solar panels. These solar panels may be mounted on rooftops, such as on the roof of a residential home or commercial building. These rooftops are often covered in shingles or other similar roofing material. Accordingly, the solar panels must be mounted to these roofs such a way as to not disturb the roofing material.

Particular problems arise when the roofing material includes a plurality of tiles or shingles, such as slate tiles, which must first be removed such that the solar panel can be secured directly to the roof, rather than through the tiles. Replacing the plurality of tiles once the solar panel has be secured to the roof is a difficult and arduous process, and significantly increases costs associated with mounting solar panels to roofs with slate tiles. The manufacturing of structurally durable mounting assembly at low cost is another issue for solar panel installation.

SUMMARY

It would be desirable to provide a mounting assembly that addresses at least some of the issues discussed above, as well as other potential issues. Moreover, it would be beneficial to furnish an integrated system for increased strength at low cost.

Accordingly, the solar mount assembly and methods are disclosed for solar panel installation purposes substantially as shown in and/or described in connection with at least one of the figures, and as set forth more completely in the claims.

More specifically, examples of the present disclosure are generally directed to solar panel mount, and methods for installing solar panels, wherein increased strength and improved structural integrity are desirable.

An aspect of the patent document provides a solar panel mount, which includes a bracket plate attached to a base plate. The bracket plate has a top edge, a bottom edge, two opposite side edges flanking the surface of the plate. To increase the strength and structural integrity, the bracket plate contains a flange in at least a portion of one of the two side edges and/or a ridge extending in a longitudinal direction from the bottom edge towards the top edge. The base plate is attached to the bottom edge of the plate and secures the mount to a roof.

In some implementations, each of the side edges is in the form of the flange transverse to the first surface. In some implementations, the flange in each instance independently has a height ranging from about 3 to about 10 mm.

In some implementations, the first surface further comprises a ridge extending in a direction parallel to the side edges. In some implementations, the ridge and the flange are both protruding from the first surface. In some implementations, each of the side edges is in the form of the flange transverse to the first surface, and the ridge is spaced equally from the two side edges.

In some implementations, the ridge has a height ranging from about 3 to about 10 mm. In some implementations, the ridge is formed by concaving a second surface opposite to the first surface in the bracket plate.

In some implementations, the height of the flange and the width of the plate are in a ratio ranging from about 1:2 to about 1:20.

In some implementations, the bracket plate comprises, from the bottom edge to the top edge, continuous portions including a bottom portion, a top portion, and at least one middle, and each of the continuous portions is transverse to its adjacent portion. In sonic implementations, the bracket comprises at least two middle portions, and the top portion together with the two middle portions forms a U shape. In some implementations, the bracket plate and the base plate are a single, monolithic, integrated structure. In some implementations, the top portion comprises a serrated surface.

In some implementations, the solar mount includes a slot adjacent to the top edge for receiving a fastening member to fasten the solar panel mount to a solar panel. In some implementations, the bracket plate is a single, monolithic, integrated structure.

In sonic implementations, the base plate comprises two opposite base flanges flanking a base surface, wherein the base flanges are transverse the base surface. In some implementations, one of the base flanges is taller than the other, is orthogonal to the flange of the bracket plate, and is attached to bottom portion of the bracket plate. In some implementations, the base flanges align with the flanges of the bracket plate. In some implementations, a ridge extends from the base plate to the bracket plate. In some implementations, the bracket plate and the base plate are welded together.

Another aspect of the present disclosure provides a method of installing, a solar panel, comprising: mounting the base plate of the solar panel mount of claim 1 to a roof; and mounting the solar panel to the bracket plate.

In some implementations, each of the side edges is in the form of the flange transverse to the first surface.

BRIEF DESCRIPTION OF THE DRAWINGS

The drawings referenced herein form a part of the specification. Features shown in the drawings are meant as illustrative of some, but not all, embodiments of the present disclosure, unless otherwise explicitly indicated, and implications to the contrary are otherwise not to be made. Although in the drawings like reference numerals correspond to similar, though not necessarily identical, components and/or features, for the sake of brevity, reference numerals or features having a previously described function may not necessarily be described in connection with other drawings in which such components and/or features appear.

DETAILED DESCRIPTION OF THE INVENTION

Some examples of the present disclosure will now be described more fully hereinafter with reference to the accompanying drawings, in which some, but not all examples of the disclosure are shown. Indeed, various aspects of the disclosure may be embodied in many different forms and should not be construed as limited to the examples set forth herein. Rather, these examples are provided so that this disclosure will be thorough and complete and will fully convey the scope of the disclosure to those skilled in the art. Like reference numerals refer to like elements throughout.

As used herein, "and/or" means any one or more of the items in the list joined by "and/or". As an example, "x and/or y" means any element of the three-element set, e.g., {(x), (y), (x, y)}.

The following detailed description is merely illustrative in nature and is not intended to limit the implementations of the subject matter or the application and uses of such implementations. As used herein, the word "exemplary" means "serving as an example, instance, or illustration," Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Referring more particularly to the drawings, examples of the present disclosure include devices and brackets for mounting solar panel assemblies. The solar panel mount is adaptable to various types of roofing structures. Without comprising its utility and flexibility, the mount demonstrates enhanced strength and improved structural integrity and is therefore advantageous over conventional devices. The mounting bracket plate and/or base plate can be monolithically formed from a single piece of material.

An aspect of the patent document provides a solar panel mount, which includes a bracket plate attached to a base plate. The bracket plate has a top edge, a bottom edge, two opposite side edges flanking the plate. To increase the strength and structural integrity, the bracket plate contains a flange in at least a portion of one of the two side edges and/or a ridge extending in a longitudinal direction from the bottom edge towards the top edge. The base plate is attached to the bottom edge of the plate and secures the mount to a roof.

The top edge of the bracket plate is positioned higher than the bottom edge after the bracket plate is attached to the base plate or after the solar panel mount is installed on a roof so that the top edge can receive an additional component of a solar panel assembly. The bracket plate may contain a single flat surfaced plate or two or more continuous portions (e.g. bottom portion, one or more middle portions, and top portion) from the bottom edge to the top edge. The top portion can contain a slot for receiving or attaching the solar panel assembly. Each two adjacent portions have surfaces transverse to each other at an angel ranging, for example, from about 20° to about 300°, from about 40° to about 270°, from about 40° to about 160°, from about 60° to about 130°, from about 80° to about 110°, from about 80° to about 100°, or from about 85° to about 95°. The side edges flanking the same portion of the bracket plate are preferably parallel to each other.

Figure 11:
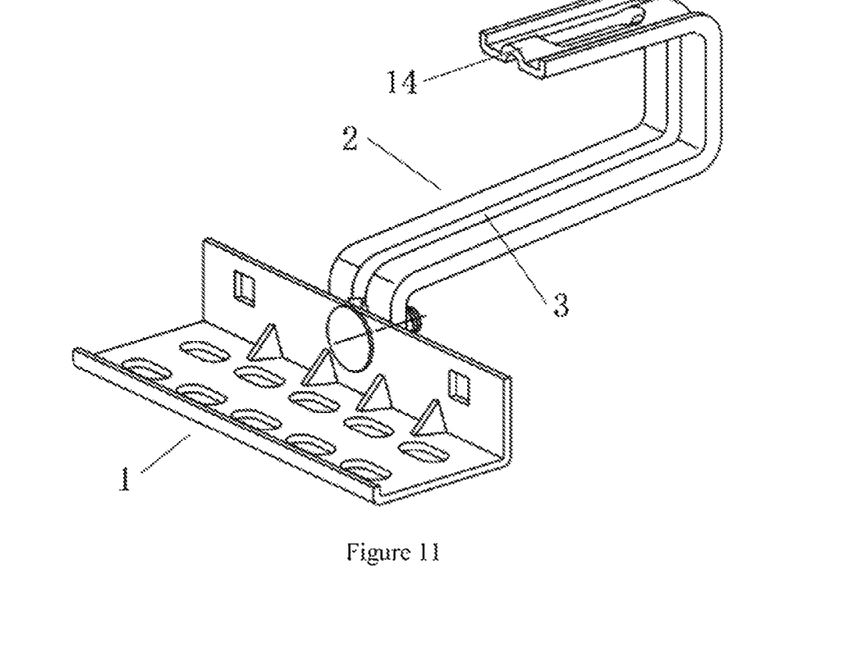
FIG. 11 illustrates an exemplary implementation of a base plate attached to a bracket plate via a fastener going through a side flange of the base plate and an aperture of the bottom portion of the bracket plate; the base plate further contains a shorter flange and reinforce components; the bracket plate contains a ridge two flanges; the top portion forms a U shape with its two proceeding middle portions.

In some embodiments, the bracket plate has three, four, or five portions, where in the bottom portion can be attached to the base plate and has a surface transverse to that of the base plate or the roof where the base plate sits on. The middle portion has a surface transverse to both of the surface of the top portion and the bottom portion. Exemplary structures are provided in FIGS. 1-4. In some embodiments, the top portion and its two proceeding portions form a U shape (FIG. 11).

Figure 5:
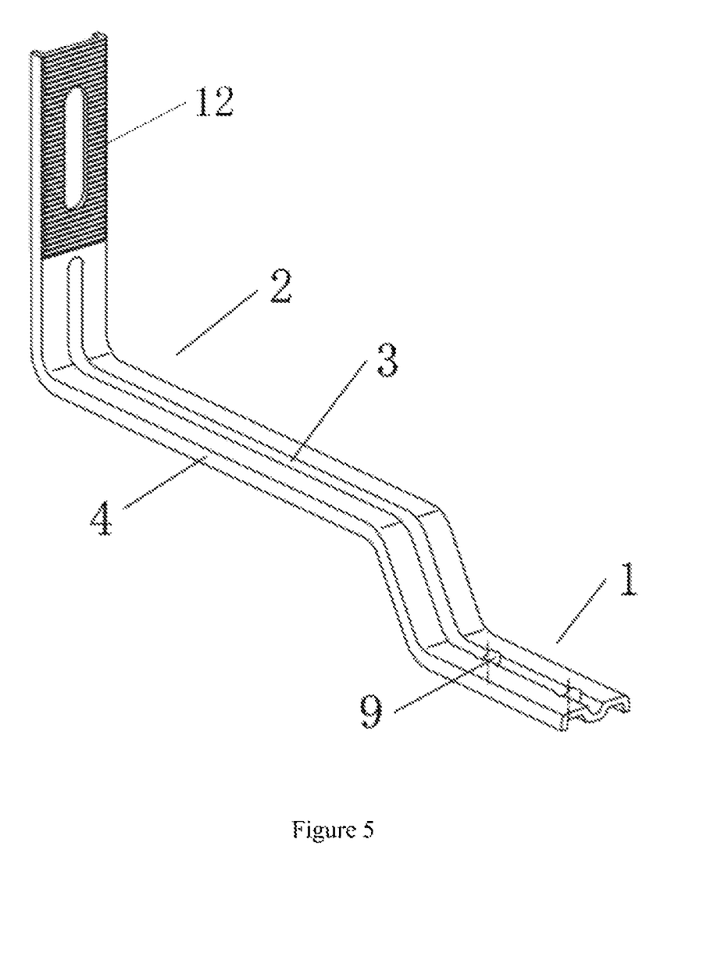
FIG. 5 illustrates an exemplary implementation of a bracket plate integrated with a base plate, which contains two flanges and a ridge extending from the base plate to the bracket plate, wherein the bracket plate and the base plate are a single, monolithic, integrated structure; the base flanges in the base plate align with the flanges of the bracket plate.
Figure 6:
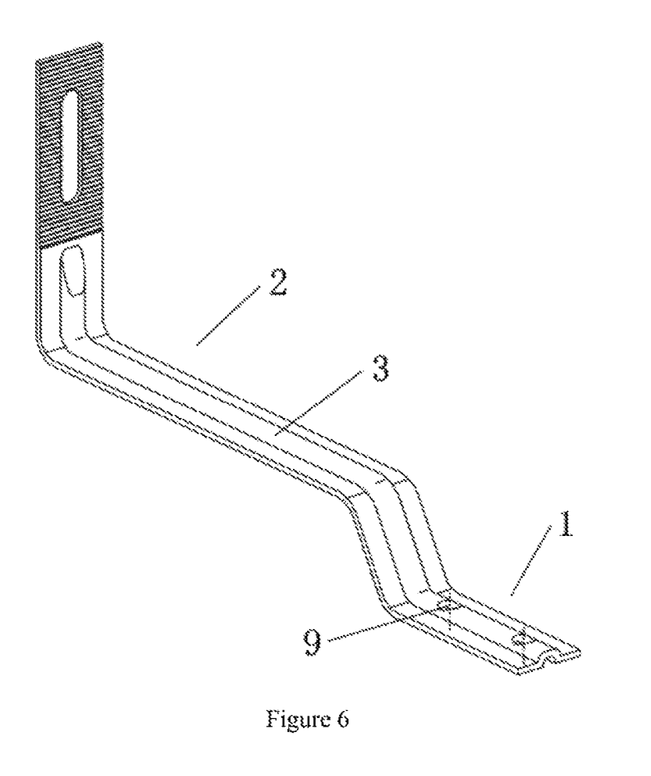
FIG. 6 illustrates an exemplary implementation of a bracket plate integrated with a base plate, which contains two flanges and a ridge extending from the base plate to the bracket plate, wherein the bracket plate and the base plate are a single, monolithic, integrated structure.
Figure 7:
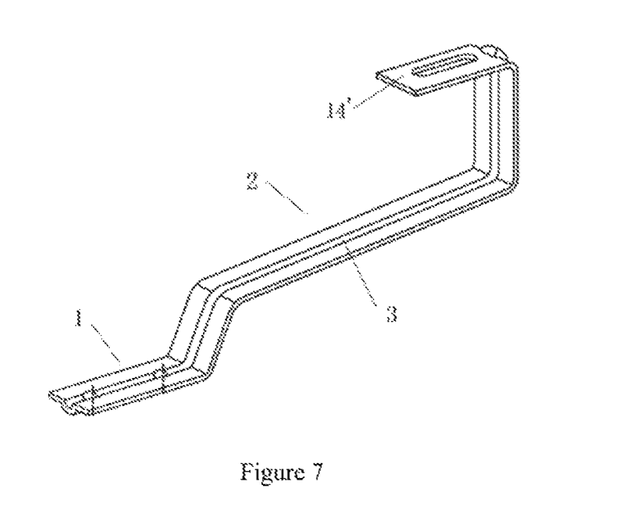
FIG. 7 illustrates an exemplary implementation of a bracket plate integrated with a base plate, which contains a ridge extending from the base plate to the bracket plate, wherein the bracket plate and the base plate are a single, monolithic, integrated structure, wherein the top portion forms a U shape with its two proceeding middle portions and contains a lot for receiving a fastener.

In some embodiments, the bracket plate has three or four or live continuous portions, and the bracket plate and the base plate are a single, monolithic, integrated structure. FIG. 5, FIG. 6 and FIG. 7 provide exemplary structures of the bracket plate and the base plate, the bracket plate and the base plate are a single, monolithic, integrated structure. Each of the middle portions has a surface transverse to that of its adjacent portions. The top portion can include a slot for attaching to a component of the solar panel assembly. In some embodiments, the top portion and its two proceeding portions form a U shape.

At least a portion of at least one of the sided edges of the bracket plate is in the form of a flange. Preferably, each of the two side edges has at least a portion as a flange in some embodiments, the flanges in one or both of the side edges extend from the bottom edge to the top edge. Each of the flanges has an angle with the plate surface ranging from about 40° to about 160°, from about 60° to about 130°, from about 80° to about 110°, from about 80° to about 100°, or from about 85° to about 95°. In some embodiments, both flanges are transverse to the plate surface at an angle of about 90°. In some embodiments, both flanges protrude from the first surface and are transverse to the first surface substantially at a right angle as shown in the figures.

The two flanges may be protruding from the same plate surface or from opposite surfaces of the same plate. The height of the flange may range from about 1 to about 20 mm, from about 1 to about 15 mm, from about 1 to about 10 mm, from about 2 to about 15 mm, from about 3 to about 10 mm, from about 3 to about 8 mm, or from about 3 to about 5 mm. In some embodiments, the ratio between the height of the flange and the width of the bracket plate can ranging from about 1:3 to about 1:100, from about 1:5 to about 1:50, from about 1:5 to about 1:30, from about 1:5 to about 1:20, from about 1:10 to about 1:20, or from about 1:10 to about 1:15.

The plate surface may contain one, two, three, or more ridges extending in a longitudinal direction from the bottom edge towards the top edge. The ridge can be formed by concaving from the opposite surface during the manufacturing process. Preferably, the ridge starts from the bottom edge and extend for at least 50%, at least 60%, at least 70%, at least 80%, at least 90%, or at least 95% of the length of the plate along the surface. When the plate has multiple ridges, they can be on the same or opposite sides of the plate. For instance, a first ridge is on a first surface of the plate and a send ridge is on the opposite surface. Preferably, the plurality of ridges are evenly spaced on the plate. For instance, a plate with two ridges can divide the plate in three equal portions. Alternatively, the two ridges can have the same distance from their respective closest side edge. The height of the ridge may range from about 1 to about 20 mm, from about 1 to about 15 mm, from about 1 to about 10 mm, from about 2 to about 15 mm, from about 3 to about 10 mm, from about 3 to about 8 mm, or from about 3 to about 5 mm. In some embodiments, the ratio between the height of the ridge and the width of the bracket plate can ranging from about 1:3 to about 1:100, from about 1:5 to about 1:50, from about 1:5 to about 1:30, from about 1:5 to about 1:20, from about 1:10 to about 1:20, or from about 1:10 to about 1:15.

The bracket plate can have one or both features of the flanges at the side edges and the ridge at the plate surface. In some embodiments, the flanges and ridge can protrude from the same first surface. In some embodiments, the flange(s) and ridge protrude from the same first surface of the bracket plate. In sonic embodiments, the flanges protrude from the first surface and the ridge from the opposite second surface of the bracket plate.

In some embodiments, the entire bracket plate including the side edges and or the ridge is a single, monolithic structure. Such an integrated structural design not only provides increased strength but also is cost efficient for manufacturing from a single piece of material.

The base plate includes two side edges on opposite side of a surface. In some embodiments, one or both of the side edges is in the form of a flange transverse to the surface of the base plate. The height of each of the flanges may independently range from about 1 to about 200 mm, from about 5 to about 200 mm, from about 20 to about 200 mm, from about 50 to about 200 mm, from about 50 to about 100 mm, from about 1 to about 15 mm, from about 1 to about 10 mm, from about 2 to about 15 mm, from about 3 to about 10 mm, from about 3 to about 8 mm, or from about 3 to about 5 mm. In some embodiments, the base plate includes a flange (e.g. 50-150 mm tall), which provides an attachment point to the bracket plate and strengthens the base plate. In some embodiments, the base plate includes a low flange (e.g. 3-10 mm) opposite the side edge attaching to the bracket plate as exemplified in FIGS. 10 and 11.

Figure 8:
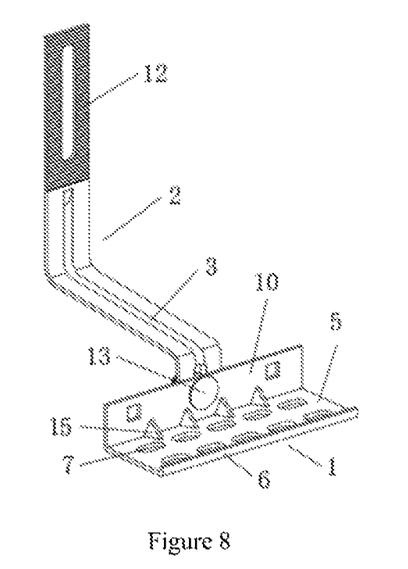
FIG. 8 illustrates an exemplary implementation of a base plate attached to a bracket plate via a fastener going through a side flange of the base plate and an aperture of the bottom portion of the bracket plate; the base plate further contains a shorter flange and reinforce components; the bracket plate contains a ridge.

In some embodiments, the base plate comprises two opposite base flanges flanking a base surface, wherein the base flanges are transverse the base surface. In some embodiments, one of the base flanges is taller than the other, orthogonal to the flange of the bracket plate, and attached to bottom portion of the bracket plate. FIG. 8 provides an exemplary embodiment.

In some embodiments, each of the base flanges align in a virtual plane with a respective one of the flanges of the bracket plate. For instance, a first base flange and a first flange of the bracket plate align and are positioned in the same first virtual plane, and a second base flange and a second flange of the bracket plate align and are positioned in the same second virtual plane. FIG. 5 provides an exemplary embodiment, which also has the bracket plate and the base plate as a single, monolithic, integrated structure.

Figure 2:
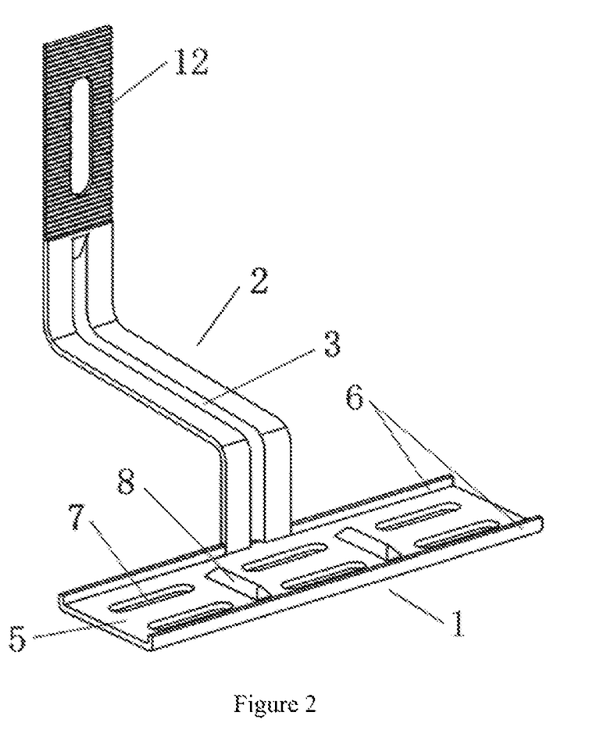
FIG. 2 illustrates a side view of an exemplary implementation of a bracket plate connected to a base plate, wherein the bracket plate contains a ridge.

The base plate may include one or more reinforcer 8 as exemplified in FIG. 2. One or more reinforcers such as wedge 14 exemplified in FIG. 8 can be added.

Various means of attachment can be adopted between the bracket plate and the base plate. In an exemplary embodiment of FIG. 1, the base plate and the bracket plate are welded to each other. In another exemplary embodiment of FIG. 8, the base plate and the bracket plate are bolted to each other.

Figure 1:
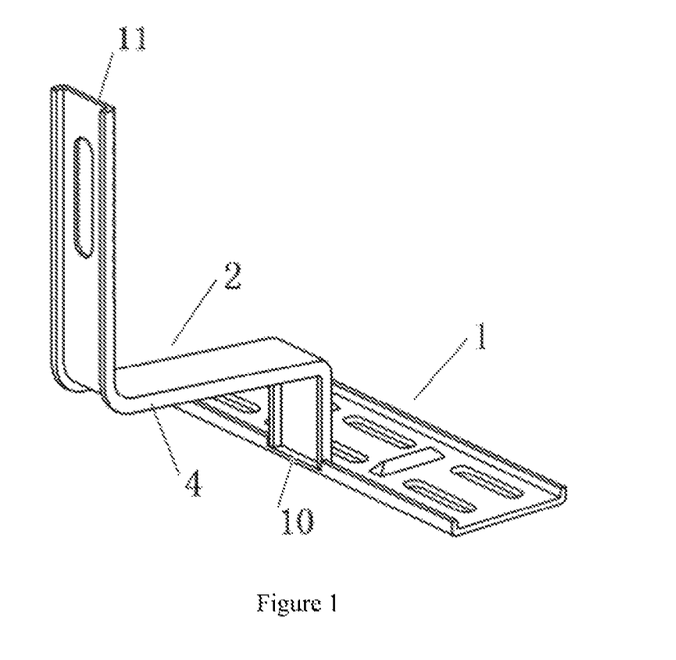
FIG. 1 illustrates an exemplary implementation of a bracket plate connected to a base plate, wherein the bracket plate contains two flanges.

Turning to FIG. 1, an exemplary solar panel mount includes a base plate 1 and a bracket plate, which are welded together at the bottom edge of bracket plate 2 and the side edge of the base plate 1. The base plate 1 can be secured to a structure such as rooftop via for example a screw through the slot on the base plate. The two side edges of the bracket plate 2 are each in the form of a flange 4, which is transverse to the surface between the side edges. The flange 4 extends from the bottom edge 10 to the top edge 11 of the bracket plate. The bracket plate include three continuous portions: a bottom portion abutting the base plate, a top portion at the end of the top edge, and a middle portion between the top and bottom portions. Each portion is transverse to its adjacent portion.

Referring to FIG. 2, the base plate includes two flanges 6 at opposite sides of the plate. The bracket plate is welded to the flange of the base plate. Slot 7 receives a fastener such as a bolt-nut combination to secure the plate to a structure. Reinforcer 8 on a top surface 5 helps maintain the structural integrity of plate 1. Different from the bracket plate in FIG. 1, plate 2 here includes a ridge extending from a bottom edge of the plate in parallel to its side edge. The opposite side of the ridge is a concave because the ridge is formed by pushing from the other side of the plate. The top portion of the bracket plate also includes an area with grooves or a serrated surface. The top portion of the bracket plate includes slot 12 for receiving a fastener to attach the bracket to another mounting component of a solar panel assembly.

Figure 3:
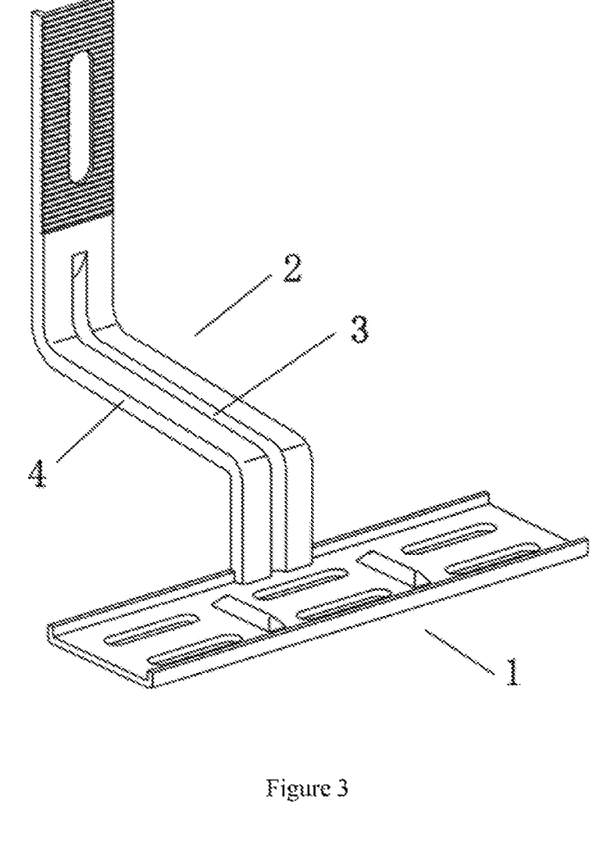
FIG. 3 illustrates a side view of an exemplary implementation of a bracket plate connected to a base plate, wherein the bracket plate contains two flanges and a ridge.

Referring to FIG. 3, the bracket plate incorporates the features of the brackets in FIGS. 1 and 2 and includes two flanges as well as a ridge. The ridge is positioned between the two flanges.

Figure 4:
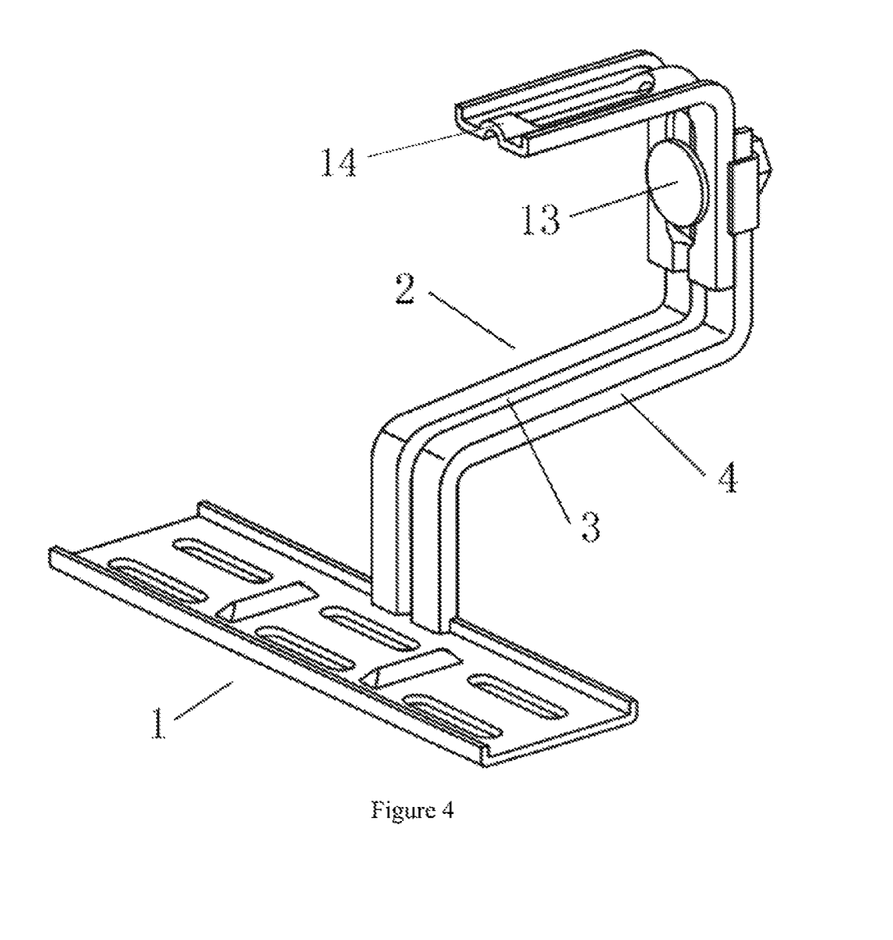
FIG. 4 illustrates an exemplary implementation of a bracket plate connected to a base plate, wherein the top portion of the bracket plate is further connected to a bracket component for installing a solar panel.

Referring to FIG. 4, the top portion of the bracket is further attached to a mounting component 14 via fastener 13 (e.g. a bolt and a locking nut). The bracket includes two flanges 4 and ridge 3.

Referring to FIG. 5, the bracket plate includes three continuous portions. The bracket plate and the base plate are a single, monolithic, integrated structure. The aperture 9 can be aligned on a roof and allows for a screw to fasten the base plate to a roof structure. The flanges of the extend from the base plate to the bracket plate. The ridge similarly extends from the base plate to the bracket plate.

Referring to FIG. 6, the bracket plate is strengthened by ridge 3, which is in the opposition direction from that of FIG. 5. The bracket plate and the base plate are a single, monolithic, integrated structure. The ridge extends from the base plate to the bracket plate. The aperture 9 fastens the base plate to a roof structure with a screw.

Referring to FIG. 7, the bracket plate and the base plate are a single, monolithic, integrated structure. Ridge 3 extends from the base plate to the bracket plate. The top portion includes an aperture for receiving a fastener such as a bolt-nut combination to secure the plate to another mounting component of a solar panel assembly. The top portion 14' is similar to the mounting component 14 in FIG. 4 and forms a U shape with its two proceeding middle portions.

Referring to FIG. 8, the base plate includes two flanges 6 and 10 at opposite edges of the plate. Flange 6 is shorter in height than flange 10. The apertures on flange 10 and the bottom portion of bracket plate 2 align with each other so that a bolt goes through the aperture and attach the base plate to the bracket plate. Therefore, flange 10 not only improves the structural integrity of the plate but also provides an attachment point with the bracket plate. The base plate also include wedge 15, which is formed by concaving or pressing, from the opposite side during manufacturing process and further strengthens the structural integrity of the base plate and the whole mount. The wedges are symmetrically aligned against flange 10. Slot 7 on surface 5 of the base plate allows for adjustable attachment of the base plate to the roof. The slot in the top portion of the bracket plate has an enlongated shape so that the position of a fastener it receives can be adjusted.

Figure 9:
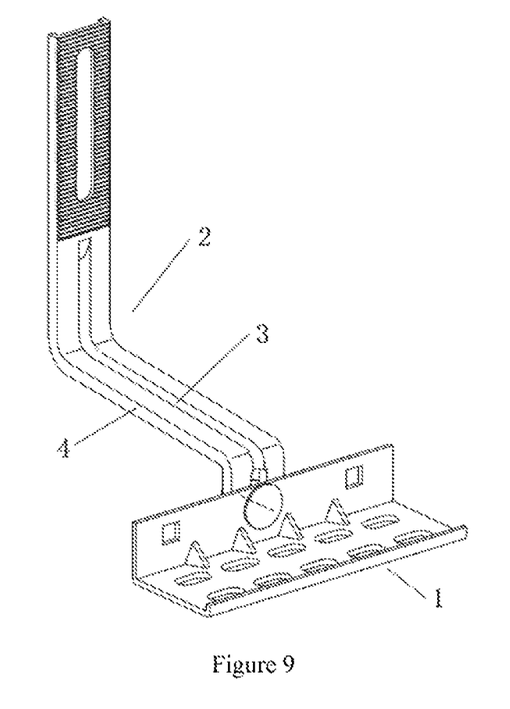
FIG. 9 illustrates an exemplary implementation of a base plate attached to a bracket plate via a fastener going through a side flange of the base plate and an aperture of the bottom portion of the bracket plate; the base plate further contains a shorter flange and reinforce components; the bracket plate contains a ridge and two flanges.

FIG. 9 is similar to FIG. 8 but adds the feature of two flanges 4 for the bracket plate. The bracket plate is attached to the flange of the base plate via a lock-nut design. The structural components of the bracket include the flanges, the ridge, and the surface, all of which are in a single, monolithic structure.

Figure 10:
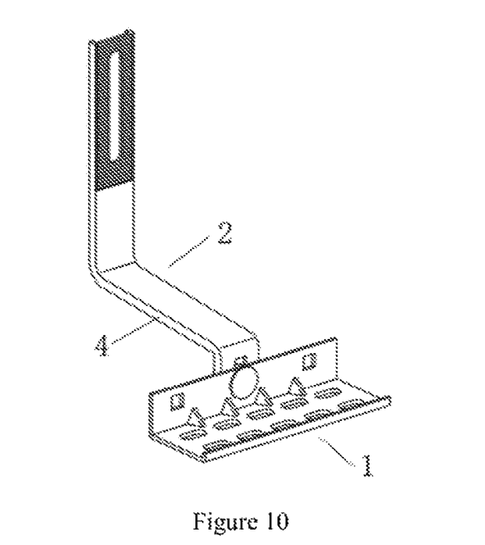
FIG. 10 illustrates an exemplary implementation of a base plate attached to a bracket plate via a fastener going through a side flange of the base plate and an aperture of the bottom portion of the bracket plate; the base plate further contains a shorter flange and reinforce components; the bracket plate contains two flanges.

FIG. 10 includes all structural components of FIG. 9 except the ridge on the bracket plate. The bracket plate is attached to the flange of the base plate via a lock-nut design.

FIG. 11 includes a bracket plate with 4 portions. The bottom portion is attached to a tall flange of the base plate via a lock-nut assembly. The two middle portions each have a surface transverse to their adjacent portions. The top portion together with its two proceeding portions forms a U shape. Alternatively, the top portion hovers over a middle portion. The top portion includes a slot for receiving a fastener to attach the bracket to another mounting component of a solar panel assembly. The flanges of the bracket plate extend from the bottom edge in the bottom portion to the very top edge in the top portion. The ridge extends from the bottom portion to the top portion.

Figure 12:
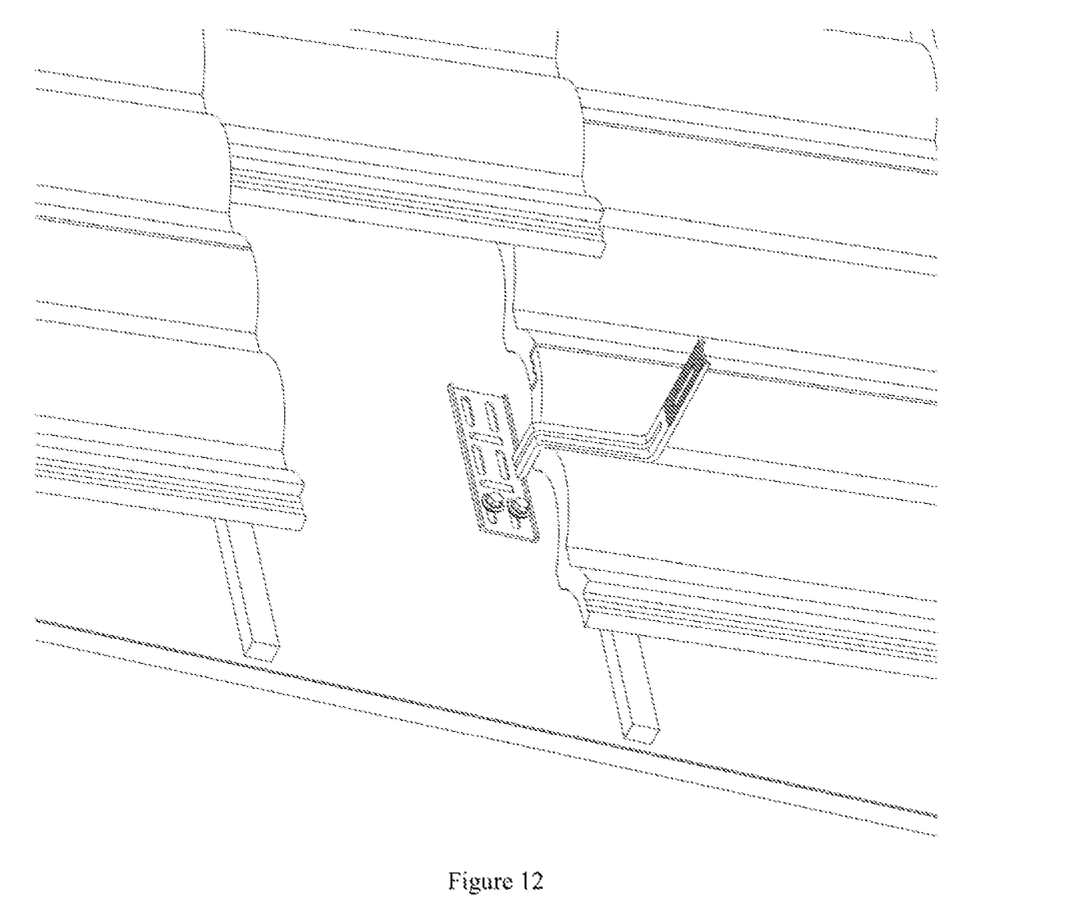
FIG. 12 illustrates an exemplary implementation of a solar mount on a roof; the bracket plate is welded to the base plate.
Figure 13:
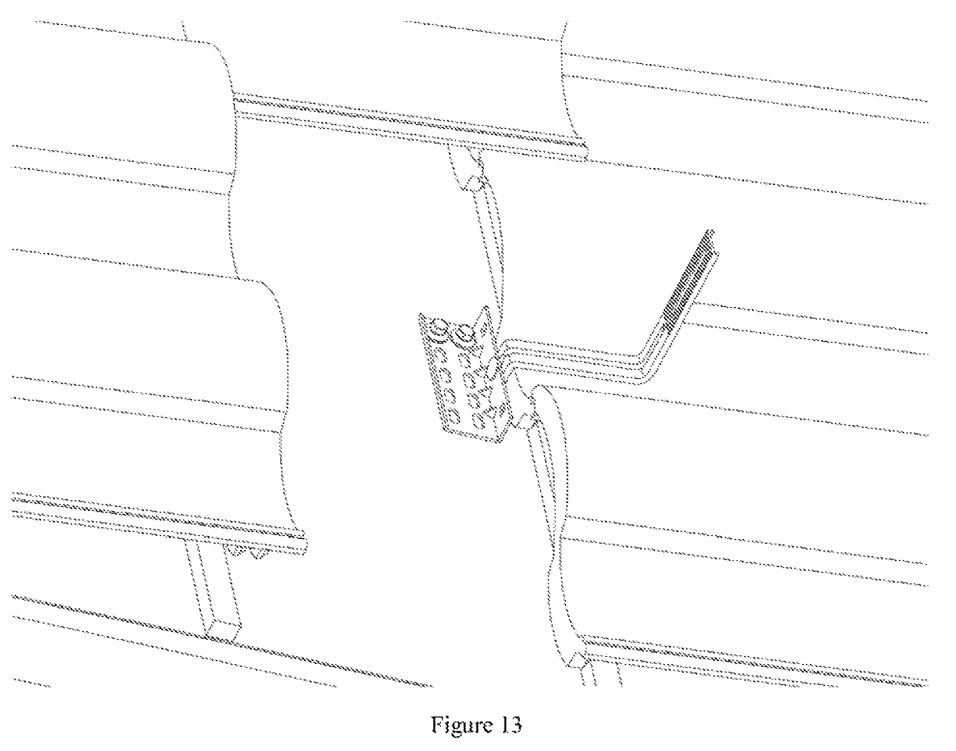
FIG. 13 illustrates an exemplary implementation of a solar mount on a roof; the bracket plate is secured to the taller flange of the base plate via a fastener.
Figure 14:
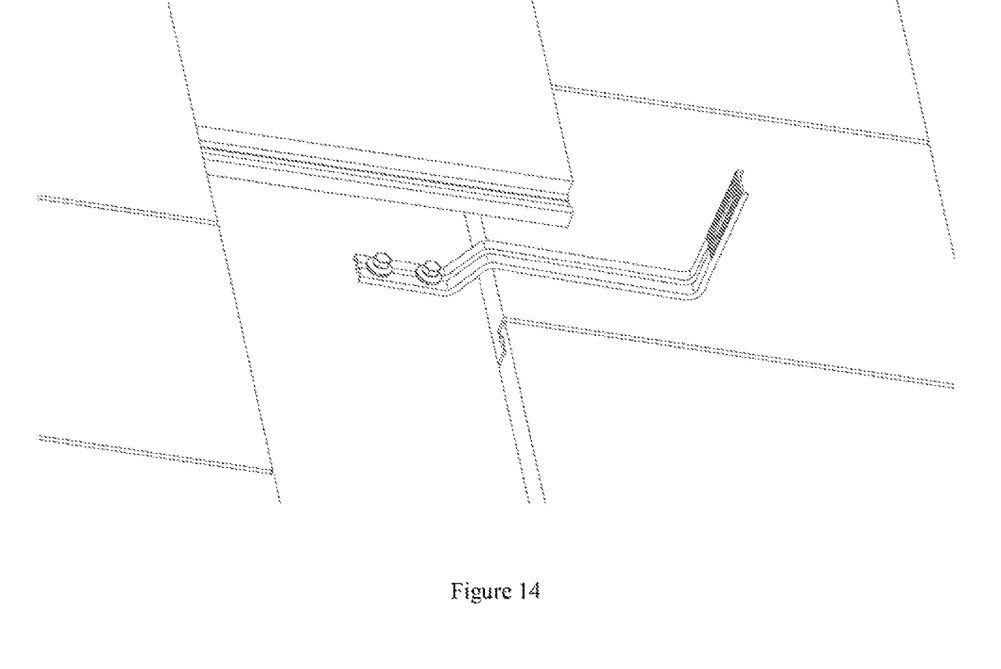
FIG. 14 illustrates an exemplary implementation of a solar mount on a roof; wherein the bracket plate and the base plate are a single, monolithic, integrated structure.

FIGS. 12-14 illustrates exemplary implementations of a solar mount on a roof. In FIG. 14, the bracket plate and the base plate are a single, monolithic, integrated structure. The flanges and the ridge extend from the base plate to the bracket plate.

Figure 15:
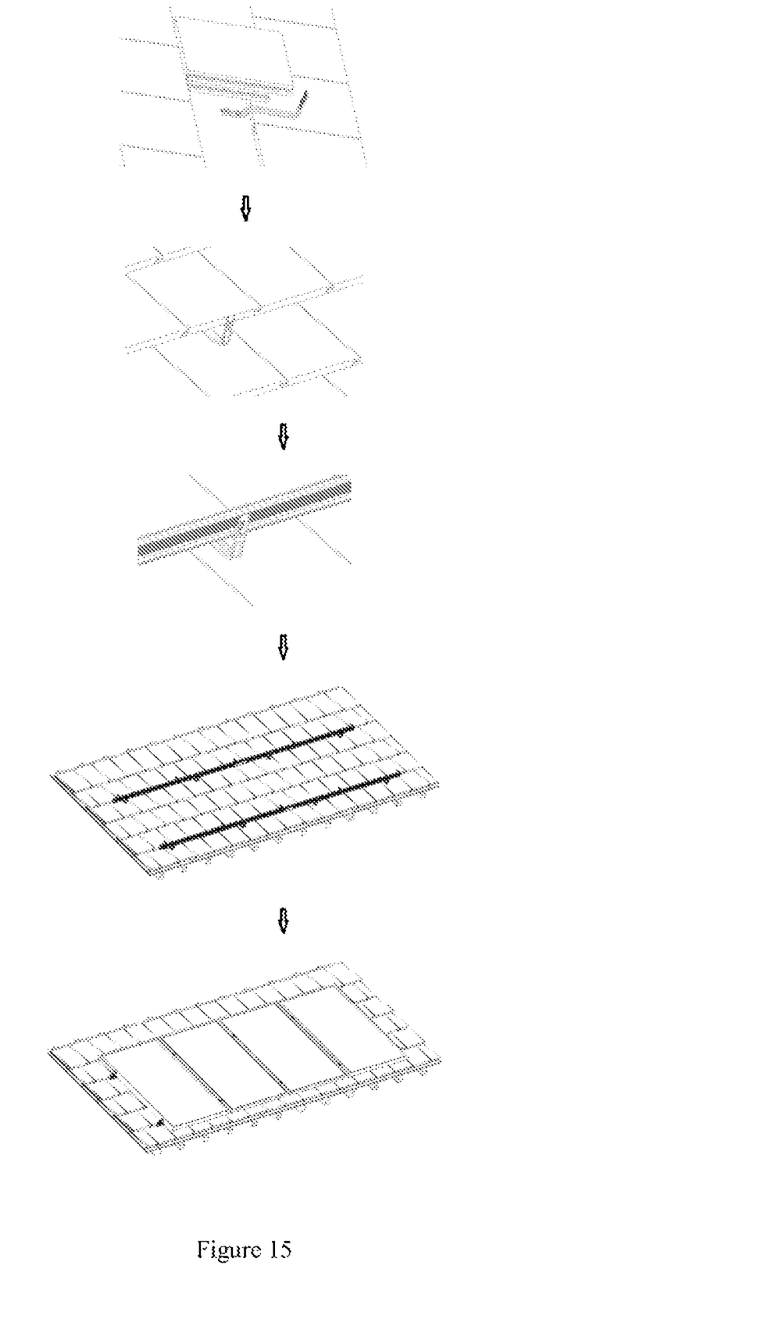
FIG. 15 illustrates an exemplary implementation of mounting solar panels.

FIG. 15 illustrates the installation of solar panels on the rooftop. The process includes: removing a tile and installing the solar mount on the roof; replacing the tile; installing the rails on the bracket plate of the solar mount; and installing the solar panels on the rails.

Another aspect of the patent document provides a method of installing a solar panel to a roof. The method generally includes mounting the base plate of the solar panel mount described. herein to a roof and mounting the solar panel to the bracket plate.

In an exemplary embodiment, a roof tile is removed from a roof. The roof tile may be a slate tile. Removing the roof tile may expose a roof substrate. Removing the roof tile may include removing only a single roof tile, such that a portion of the roof substrate corresponding to only the single roof tile is exposed. The base plate of the solar panel mount is mounted to the roof substrate adjacent to where the roof tile was removed. Mounting the base plate of the solar panel mount may include aligning the base plate of the solar panel mount between adjacent roof tiles on the roof substrate. In some embodiments, mounting the solar panel mount to the roof substrate include sliding portions of the base plate between adjacent roof tiles and the roof substrate. The bracket plate is then secured to the base plate if they are not yet attached together. A mounting component of a solar panel is fastened to the bracket plate of the solar panel mount. For example, a fastening member may be used to fasten the solar panel to the bracket plate. In some embodiments, a mounting component (e.g. a rail) of the solar panel (or an assembly supporting a solar panel) is mounted to the bracket plate before the solar panel is installed.

Many modifications and other examples of the disclosure set forth herein will come to mind to those skilled in the art to which this disclosure pertains, having the benefit of the teachings presented in the foregoing descriptions and the associated drawings. Therefore, it is to be understood that the disclosure is not to be limited to the specific examples disclosed and that modifications and other embodiments are intended to be included within the scope of the appended claims.

Moreover, although the foregoing descriptions and the associated drawings describe aspects of the disclosure in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A solar panel mount, comprising:
 (a) a bracket plate comprising a first surface, a top edge, a bottom edge, and two opposite side edges flanking the first surface, wherein at least a portion of one of the side edges is in the form of a flange transverse to the first surface; and
 (b) a base plate attached to the bottom edge of the bracket plate, wherein the base plate comprises:

a base surface flanked by two base flanges, wherein the base surface comprises multiple openings, which define a common flat area free from protrusions, a plurality of wedges in contact with the base surface and one of the flanges, wherein none of the wedges intercepts a line connecting the centers of any two adjacent openings on the base surface.

2. The solar panel mount of claim 1, wherein each of the side edges is in the form of the flange transverse to the first surface.

3. The solar panel mount of claim 1, wherein the first surface further comprises a ridge extending in a direction parallel to the side edges.

4. The solar panel mount of claim 3, wherein the ridge and the flange are both protruding from the first surface.

5. The solar panel mount of claim 3, wherein each of the side edges is in the form of the flange transverse to the first surface, and the ridge is spaced equally from the two side edges.

6. The solar panel mount of claim 3, wherein the ridge has a height ranging from about 3 to about 10 mm.

7. The solar panel mount of claim 3, wherein the ridge is formed by concaving a second surface opposite to the first surface in the bracket plate.

8. The solar panel mount of claim 1, wherein the flanges have a height ranging from about 3 to about 10 mm.

9. The solar panel mount of claim 1, wherein a height of the flanges and the width of the plate are in a ratio ranging from about 1:2 to about 1:20.

10. The solar panel mount of claim 1, wherein the bracket plate comprises, from the bottom edge to the top edge, continuous portions including a bottom portion, a top portion, and at least one middle portion, and each of the continuous portions is transverse to its adjacent portion, and wherein both side edges are in the form of the flanges.

11. The solar panel mount of claim 10, wherein the bracket plate comprises at least two middle portions, and the top portion together with the two middle portions forms a U shape.

12. The solar panel mount of claim 10, wherein the top portion comprises a serrated surface.

13. The solar panel mount of claim 10, wherein the bracket plate and the base plate are a single, monolithic, integrated structure.

14. The solar panel mount of claim 10, wherein the base flanges are transverse to the base surface.

15. The solar panel mount of claim 14, wherein one of the base flanges is taller than the other, orthogonal to the flange of the bracket plate, and attached to bottom portion of the bracket plate.

16. The solar panel mount of claim 14, wherein each of the base flanges aligns in a common virtual plane with a respective one of the flanges of the bracket plate.

17. The solar panel mount of claim 16, wherein the bracket plate and the base plate are a single, monolithic, integrated structure.

18. The solar panel mount of claim 16, wherein a ridge extends from the base plate to the bracket plate.

19. A method of installing a solar panel, comprising:
mounting the base plate of the solar panel mount of claim 1 to a roof; and
mounting the solar panel to the bracket plate.

20. The method of claim 19, wherein each of the side edges is in the form of the flange transverse to the first surface.

21. The solar panel mount of claim 1, wherein one of the flanges comprises multiple apertures spaced apart from each other.

* * * * *